US012750415B2

(12) United States Patent
Sivaraj et al.

(10) Patent No.: US 12,750,415 B2
(45) Date of Patent: Sep. 29, 2026

(54) PRIVATE MICRO FRONTENDS WITH API ACCESS TO CODE ARTIFACTS IN A SOFTWARE REPOSITORY

(71) Applicant: JP Morgan Chase Bank, N.A., New York, NY (US)

(72) Inventors: Hariharan Sivaraj, Edison, NJ (US); Devender Ramasahayam, Belle Mead, NJ (US); Kusith Goonawardena, Staten Island, NY (US)

(73) Assignee: JP Morgan Chase Bank, N.A., New York, NY (US)

( * ) Notice: Subject to any disclaimer, the term of this patent is extended or adjusted under 35 U.S.C. 154(b) by 56 days.

(21) Appl. No.: 18/677,735

(22) Filed: May 29, 2024

(65) Prior Publication Data

US 2025/0373678 A1 Dec. 4, 2025

(51) Int. Cl.

| | |
|---|---|
| ***H04L 67/02*** | (2022.01) |
| ***H04L 9/40*** | (2022.01) |
| ***H04L 67/51*** | (2022.01) |

(52) U.S. Cl.

CPC .............. *H04L 67/02* (2013.01); *H04L 63/10* (2013.01); *H04L 67/51* (2022.05)

(58) Field of Classification Search

CPC .......... H04L 67/02; H04L 67/51; H04L 63/10

USPC .......................................................... 709/217

See application file for complete search history.

(56) References Cited

U.S. PATENT DOCUMENTS

| | | | | |
|---|---|---|---|---|
| 7,174,506 | B1 * | 2/2007 | Dunsmoir | G06F 16/958 707/E17.119 |
| 11,601,342 | B1 * | 3/2023 | Chao | H04L 41/40 |
| 11,630,941 | B1 * | 4/2023 | Gottlieb | G06F 21/53 715/234 |
| 2021/0337000 | A1 * | 10/2021 | Lord | G06Q 10/103 |

(Continued)

OTHER PUBLICATIONS

C. Amaro, T. Saraiva, D. Duarte, P. Vieira, M. P. Queluz and A. Rodrigues, "Developing a New Simulation and Visualization Platform for Researching Aspects of Mobile Network Performance," 2021 24th Intl Symposium on Wireless Personal Multimedia Communications (WPMC), Okayama, Japan, 2021, pp. 1-6 (Year: 2021).*

(Continued)

*Primary Examiner* — Taylor A Elfervig

(74) *Attorney, Agent, or Firm* — Wood IP, LLC; Theodore A. Wood

(57) ABSTRACT

An apparatus is provided including storage encoded computer executable code for a consolidated enterprise application configured to provide, to a select set of users with credentialed private access to the consolidated enterprise application, web-based access in a form of a given user experience. In select embodiments, the given user experience involves providing access to user interface static content. The consolidated enterprise application comprises plural frontend web-based independent user interface (UI) unit applications. More specifically, the UI unit applications are individual uncontainerized micro frontends. One or more content publishing interfaces may be provided, that are configured to publish content including the code to a web service storage. The one or more content publishing interfaces are configured to use application programming interface requests to publish the content to the web service storage.

16 Claims, 4 Drawing Sheets

(56) References Cited

U.S. PATENT DOCUMENTS

| | | | | |
|---|---|---|---|---|
| 2022/0283805 | A1* | 9/2022 | Dasa | H04L 67/1097 |
| 2022/0300524 | A1* | 9/2022 | Banerjee | G06F 16/252 |
| 2022/0358179 | A1* | 11/2022 | Dasa | G06F 16/958 |
| 2023/0009811 | A1* | 1/2023 | Bakos | H04L 67/562 |
| 2023/0023654 | A1* | 1/2023 | Ricklis | G06F 9/45529 |
| 2023/0036980 | A1* | 2/2023 | Chen | G06F 9/547 |
| 2023/0214238 | A1* | 7/2023 | Yitzhaki | G06F 9/451 719/320 |
| 2023/0297444 | A1* | 9/2023 | Fernandes | G06F 9/544 719/329 |
| 2024/0330021 | A1* | 10/2024 | Dominguez | H04L 67/02 |
| 2024/0406246 | A1* | 12/2024 | Boudreau | G06F 3/04847 |
| 2025/0077315 | A1* | 3/2025 | Gupta | G06Q 40/03 |

OTHER PUBLICATIONS

U. Awada and A. Barker, "Improving Resource Efficiency of Container-Instance Clusters on Clouds, " 2017 17th IEEE/ACM International Symposium on Cluster, Cloud and Grid Computing (CCGRID), Madrid, Spain, 2017, pp. 929-934 (Year: 2017).*

D. Saxena and B. Bhowmik, "Analysis of Selected Load Balancing Algorithms in Containerized Cloud Environment for Microservices," 2024 IEEE 4th International Conference on VLSI Systems, Architecture, Technology and Applications (VLSI SATA), Bangalore, India, 2024, pp. 1-6 (Year: 2024).*

V. Kuntnár and P. Podhorský, "Micro Frontend Architecture," 2024 Zooming Innovation in Consumer Technologies Conference (ZINC), Novi Sad, Serbia, 2024, pp. 124-129 (Year: 2024).*

I Wayan Krishna Dharma B. P., et al. "Development of Modern Web Application FrontEnd Structures Using Micro FrontEnd", International Research Journal of Advanced Engineering and Science, vol. 7, Issue 1, pp. 149-155. 2022.

"Aws S3 Endpoints" retrieved from https://docs.aws.amazon.com/general/latest/gr/s3.html#s3_website_region_endpoints), 6 pages.

"AWS S3 Setting Permissions for Website Access" retrieved from https://docs.aws.amazon.com/pdfs/AmazonS3/latest/userguide/s3-userguide. pdf#WebsiteAccessPermissionsReqd, 7 pages.

* cited by examiner

PRIVATE MICRO FRONTENDS WITH API ACCESS TO CODE ARTIFACTS IN A SOFTWARE REPOSITORY

TECHNICAL FIELD

Aspects of the disclosure relate to providing a web-based enterprise application. Other aspects of the disclosure relate to developing a private web-based enterprise application using micro frontends.

BACKGROUND

Micro frontends (MFEs) can be employed to develop a web application, whereby the application's frontend is divided into smaller, self-contained modules called micro frontends. Each module can be developed, tested, and deployed independently, enabling teams to work on specific features or functions within the application. While employing micro frontends can result in benefits, they may cause disadvantages such as performance latency, code redundancy, and increased code size.

Development teams may create and deploy a private web-based application providing users with access to static content on their access devices, for example, on a smartphone, tablet, or other computing device with web browsing functionality. However, current approaches for development, for example, using a Moneta web application, can have scalability problems. It may be difficult to revise the application's architecture because the existing user interface uses one integrated frontend application.

If the application is split into multiple MFEs, each MFE needs to be containerized, requiring excess resources such as random access memory (RAM) and central processing unit (CPU) resources. Some developers use React.js and a service wrapper such as Spring Boot to containerize each micro frontend, which may result in the creation of excess Java code that is not necessary for static web applications. All these challenges can lead to increases in deployment time and unnecessary code maintenance.

SUMMARY

The embodiments featured herein help solve or mitigate the above-noted issues as well as other issues known in the art. An objective of the disclosure is to provide a private web-based application with optimized MFEs, for example, that is easily deployed, maintained, and scalable. A further objective is to provide such a web-based application that requires minimal coding and does not require too much of a user device's RAM and CPU resources.

One or more alternate or additional objectives may be served by the present disclosure, for example, as may be apparent in the following description. Embodiments of the disclosure include any apparatus, machine, system, method, articles (e.g., computer-readable media encoded to cause certain acts), or any one or more sub-parts or sub-combinations of such apparatus (singular or plural), system, method, or article (or encoding thereon or therein), for example, as supported by the present disclosure. Embodiments herein also contemplate that any one or more processes as described herein may be incorporated into a processing circuit.

In accordance with one example embodiment, apparatus is provided including storage encoded computer executable code for a consolidated enterprise application configured to provide, to a select set of users with credentialed private access to the consolidated enterprise application, web-based access formed as a user experience. In select embodiments, the given user experience involves providing access to user interface static content, for example, hypertext markup language (HTML), javascript (JS), cascading style sheets (CSS), and image files. The consolidated enterprise application comprises plural frontend web-based independent user interface (UI) unit applications.

More specifically, the UI unit applications are individual non-containerized micro frontends. One or more content publishing interfaces may be provided, that are configured to publish content including the code to a web service storage, wherein the one or more content publishing interfaces are each configured to use application programming interface (API) requests to publish the content to the web service storage.

One or more content pulling interfaces may be provided, that are configured to pull content including the code from the web service storage, wherein the one or more content pulling interfaces are each configured to use API requests to pull the content from the web service storage. The web service storage may include object storage. In other embodiments, the object storage is an Amazon S3 (simple storage service) storage. More specifically, the object storage may comprise one or more S3 buckets. A hosting server is provided that is configured to cause the UI unit applications and an associated parent container application to be instantiated with a web browser.

Another example embodiment provides a method including providing a consolidated enterprise application that provides, to a select set of users with credentialed private access to the consolidated enterprise application, web-based access in the form of a given user experience, the consolidated enterprise application comprising plural frontend web-based independent UI unit applications and an associated parent container application. The method also includes publishing content including the code to a web service storage, using API requests; pulling content including the code from the web service storage, using API requests; and a hosting server causing the UI unit applications and associated parent container application to be instantiated with a web browser.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment, is not limiting of the disclosure.

Thus, the following aspects, features, embodiments, and advantages are merely illustrative and are not considered elements or limitations of the appended claims, except where explicitly recited in a claim(s). Likewise, reference to "the disclosure" shall not be construed as a generalization of any inventive subject matter disclosed herein, and shall not be considered to be an element or limitation of the appended claims except where explicitly recited in a claim(s).

Figure 1:
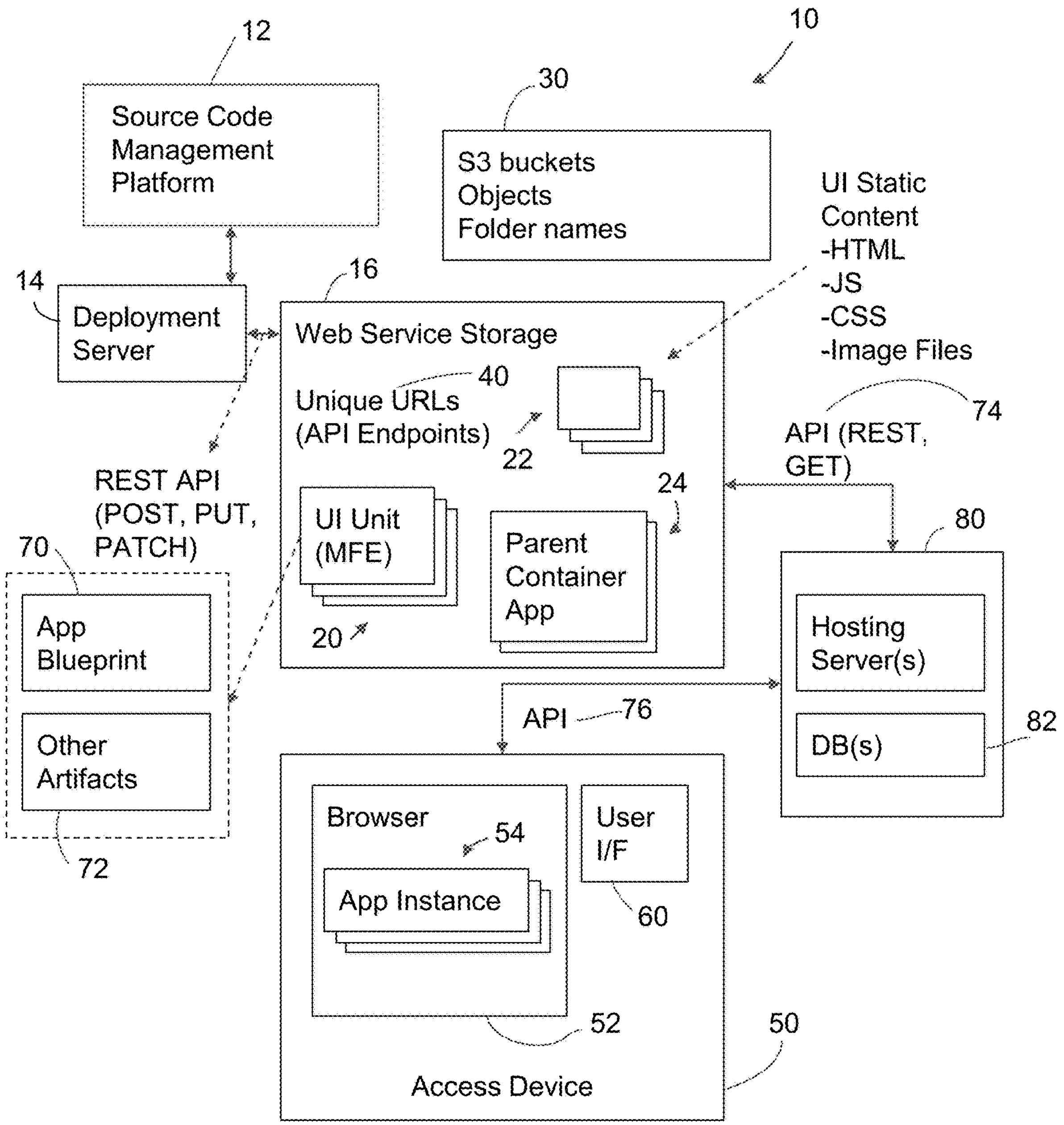
FIG. 1 illustrates a block diagram of an example web application deployment system.

FIG. 1 is a block diagram of a web application deployment system 10 in accordance with an embodiment of the present disclosure. Generally, the illustrated system 10 includes a source code management platform 12 connected, via a deployment server 14, to a web service storage 16. Web service storage 16 is coupled, via a web service storage API 74 to one or more hosting servers 80. An access device 50 is a computing device that may or may not be wearable or portable, such as a laptop, a smartphone, tablet, or the like. The access device 50 is coupled, via a hosting server API 76, to the one or more hosting servers 80 and one or more associated databases 82.

In the illustrated embodiment, the access device 50 includes a web browser 52 and a UI 60. One or more application instances 54 are operably run by the web browser 52, based on content pulled from the web service storage 16 for execution of a related consolidated enterprise application.

The source code management platform 12 may comprise, for example, a source code management platform as described below in more detail in the embodiment shown in FIG. 3. The source code management platform 12 is used for the development and deployment of code published, via the deployment server 14, to the web service storage 16. The web service storage 16 includes a set of UI unit applications 20 (MFEs in the illustrated embodiment), one or more parent container applications 24, and individual UI static content objects 22. The illustrated UI static content objects 22 may be, for example, HTML files, JS, CSS, and image files.

Selected ones of the MFEs 20 (non-containerized MFEs in the illustrated embodiment) and a given associated parent container application (app) 24 are configured to be storage encoded computer executable code (with the web browser 52 on the access device 50) for a consolidated enterprise application. The MFEs 20 and the container app 24 are configured to provide a select set of users with credentialed private access to the consolidated enterprise application, web-based access in the form of a given user experience. In the illustrated embodiment, the web app is limited primarily to static content obtained from UI static content objects 22 in the web service storage 16.

The web service storage API 74 serves as a content pulling interface configured to pull content, including the code, for the consolidated enterprise application. The web service storage API 74 then provides that content to the browser 52 via the hosting server API 76. The deployment server 14 serves as a content publishing interface configured to publish content, including code for the consolidated enterprise application, to the web service storage 16. In the embodiments, the deployment server 14 publishes using representational state transfer (REST) API POST, PUT or PATCH requests, and the web service storage API 74 pulls using REST API GET requests.

As more fully described below, with reference to FIG. 2, the consolidated enterprise application, when pulled, requires a set of MFEs 20, an associated parent container app 24, and selected ones of the UI static content objects 22. Each of the MFEs 20 includes an application blueprint 70 and may include other artifacts 72. The application blueprint 70 in the embodiment is a task definition, which may be in the form of a text file in JSON (javascript object notation) format that describes the parameters and one or more containers that form the application. More specifically, in the illustrated embodiment, the task is an elastic container service (ECS) task.

A set of MFEs 20 is provided for a given consolidated enterprise application and has an associated parent container app 24. Each of the MFEs 20 is an independent application with web accessibility and will be built, versioned, and released independently. The user experience for the consolidated application is created by consolidating the MFEs 20 in the set. The MFEs are configured to use patterns and frameworks to support horizontal scaling.

Web service storage 16 in the illustrated embodiment is an object storage system, specifically an Amazon simple storage service (S3), comprising a web service storage organization structure 30 in the form of one or more S3 buckets, data elements stored as objects, and an optional folder structure using folder names as prefixes. Each object type shown (i.e., each of the MFEs 20, the UI static content objects 22, and parent container apps 24) is assigned a unique uniform resource locator (URL) 40 for microservice autonomy and access using API endpoints.

By way of example, access may be provided using the REST protocol via the web service API 74 (when the content is pulled) and via the deployment server 14 (when the content is published).

Database or databases 82 hold data required for the applications executed by the browser 52, including, for example, user profile and authentication information.

Figure 2:
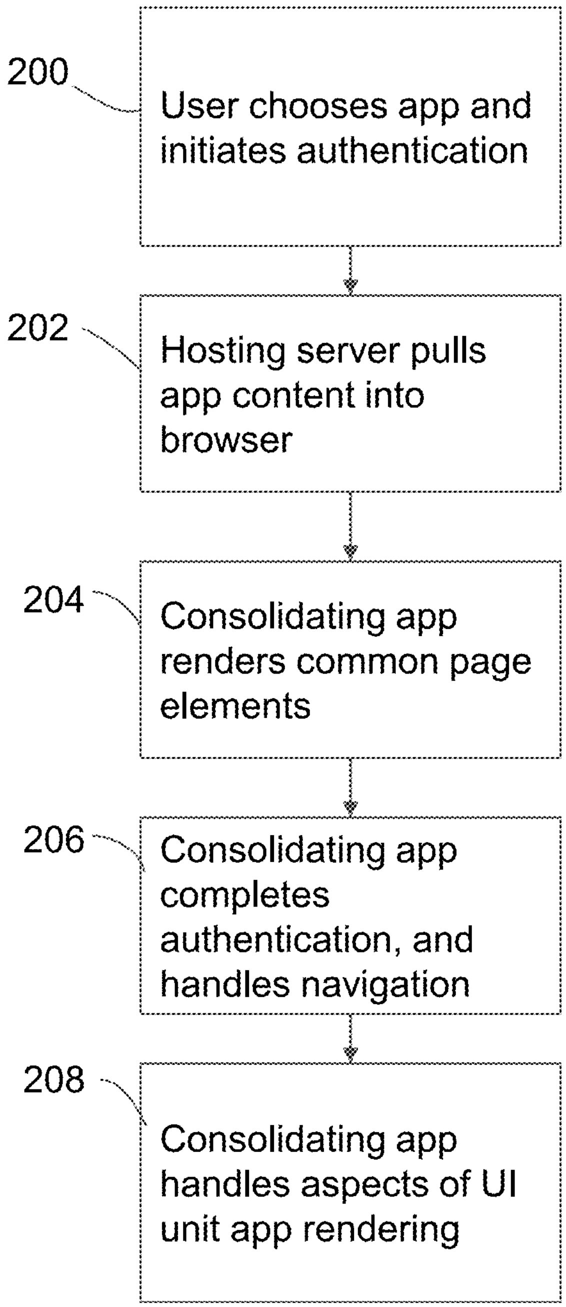
FIG. 2 illustrates an exemplary flow diagram of an application activation process.

FIG. 2 illustrates an exemplary flow diagram of an application activation process. More specifically, FIG. 2 shows when an application is executed, its content is pulled from the web service storage 16 and a number of functions are performed in an application activation process. In an initial function block 200, a user operates UI 60 to select a given web application, for example, by inputting a specified web URL or clicking on a graphical input linked to the same URL.

In block 202, the one or more hosting servers 80 pull the application files for the activated application into the browser 52. In block 204, a consolidating application (a parent container application 24 in the illustrated embodiment) renders common page elements. In block 206, the consolidating application completes authentication for the user and the access device 50 and handles navigation aspects for the consolidated application.

It is contemplated that the embodiments herein will use a secure connection, including a hypertext transfer protocol secure (HTTPS) and other security measures for private access. In this regard, features such as open authorization (OAuth) for granting access to resources and/or single sign-on (SSO) for granting user access, may be employed.

In block 208, the consolidating application handles aspects of rendering of the MFEs 20. This includes fetching requested artifacts including the MFEs 20 and the associated UI static content objects 22. This involves URL-based service requests by the one or more hosting servers 80, which in the illustrated embodiment, involves REST API GET requests using the specific URLs for the fetched content.

Figure 3:
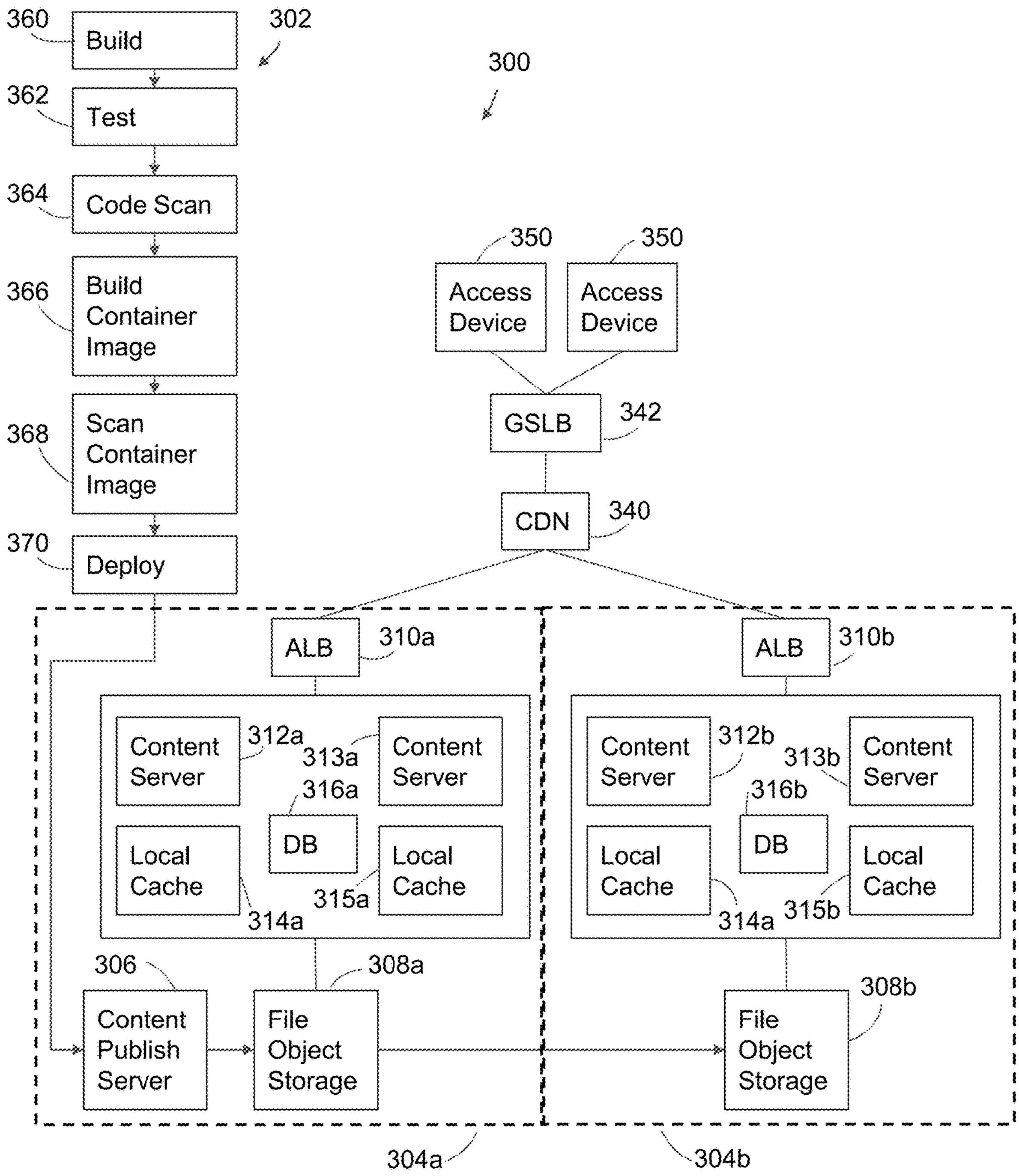
FIG. 3 illustrates a block diagram of a static content hosting and publishing system per one example embodiment.

FIG. 3 is an exemplary block diagram of a static content hosting and publishing system 300, in accordance with the embodiments. The illustrated system 300 includes a source code management system 302 and a set of one or more data centers—first and second data centers 304*a* and 304*b*. The data centers 304*a* and 304*b* are coupled to plural access devices 350 via a content delivery network 340 (e.g., Amazon Web services (AWS) CloudFront) and a global server load balancer 342.

Each of the data centers 304*a* and 304*b* includes its own file object storage 308*a*, 308*b* respectively. The first data center 304*a* also includes a content publishing server 306 (e.g., an AWS elastic container service). The data centers 304*a* and 304*b* also respectively include application load balancers 310*a*, 310*b*, a pair of servers 312*a*, 312*b*, and 313*a*, 313*b*, local caches 314*a*, 314*b*, and 315*a*, 315*b*, and local database 316*a*, 316*b*.

The illustrated file object storages 308*a* and 308*b* are S3 buckets, and hold the MFEs 20, associated parent container app 24, and the UI static content objects 22 in the manner described above with reference to FIG. 1. In the embodiment of FIG. 3, a content publish server 306 pushes content to a first file object storage 308*a*, which is then configured to replicate its data and push the same to the next file object storage 308*b*.

The content servers 312*a*, 313*a*, 312*b*, 313*b* operate in accordance with the application activation process shown in FIG. 2 as described above. The content servers 312*a*, 313*a*, 312*b*, 313*b* act independently and facilitate pulling content into a browser for a given user on respective access devices 350. The system 300 may be configured to allow for the operation of different enterprise applications on the access devices 350, requiring different sets of MFEs 20 and associated parent container app 24.

In the illustrated embodiment, each of the content servers 312*a*, 313*a*, 312*b*, 313*b* obtains user profile information from a corresponding one of the local databases 316*a*, 316*b*, and uses its corresponding local cache 314*a*, 314*b*, 315*a*, 315*b* for caching data and content as needed.

The source code management system 302 includes a builder 360 for building applications, a tester 362 for testing built applications, and a code scanner 364 for scanning code. The source code management system 302 also includes a container image builder 366 for building container images, a container image scanner 368 for scanning images, and a deploy tool 370 for deploying code.

Figure 4:
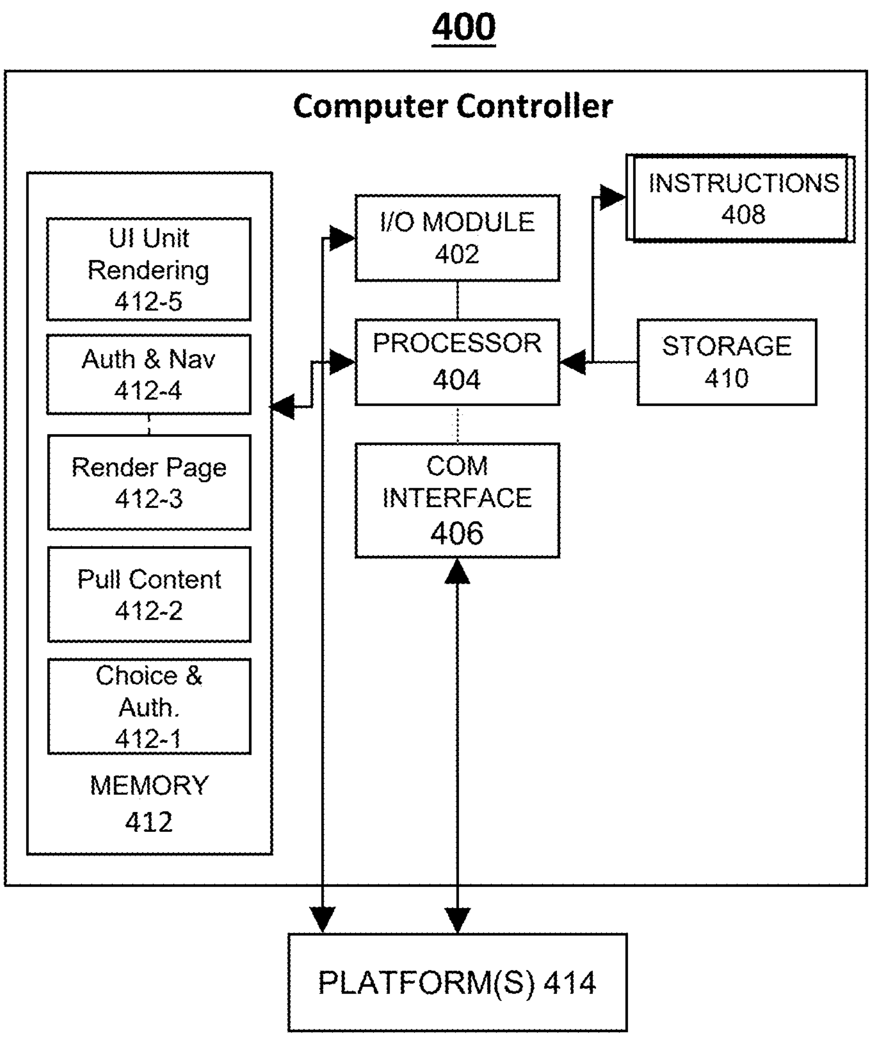
FIG. 4 illustrates a block diagram of an example computer controller.

FIG. 4 illustrates an exemplary computer controller 400 that may be an application-specific hardware, software, and firmware implementation of the web application deployment system 10 in FIG. 1, described above. The controller 400 may include a processor 404 configured to be executed on one or more, or all of the blocks of the system of FIG. 1, or the functions of the system 10, described above.

The processor 404 can have a specific structure imparted to the processor 404 by instructions stored in the memory 412 and/or by instructions 408 fetchable by the processor 404 from a storage medium 410. The storage medium 410 can be remote and communicatively coupled to the controller 400.

The controller 400 can be a stand-alone programmable system, or a programmable module included in a larger system. For example, the controller 400 may include or be connected with the web app deployment system 10. For example, the controller 400 may include one or more hardware and/or software components configured to fetch, decode, execute, store, analyze, distribute, evaluate, and/or categorize information.

The processor 404 may include one or more processing devices or cores (not shown). In some embodiments, the processor 404 may be a plurality of processors, each having one or more cores. The processor 404, in another embodiment, may be a distributed processor. The processor 404 can execute instructions fetched from the memory 412, i.e., with reference to, among other code, instructions or data, one of memory modules 412-1, 412-2, 412-3, 412-4, or 412-5.

Alternatively, the instructions can be fetched from the storage medium 410, or from a remote device connected to the controller 400 via the communication interface 406. Furthermore, the communication interface 406 can also interface with computer systems within a computer system of the system 10. An input/output (I/O) module 402 may be configured for additional communications to or from associated local and/or remote systems of one or more platforms 414 of system 10.

Without loss of generality, the storage medium 410 and/or the memory 412 can include a volatile or non-volatile, magnetic, semiconductor, tape, optical, removable, non-removable, read-only, random-access, or any type of non-transitory computer-readable computer medium. The storage medium 410 and/or the memory 412 may include programs and/or other information usable by processor 404. Furthermore, the storage medium 410 can be configured to log data processed, recorded, or collected during the operation of controller 400.

The data may be time-stamped, location-stamped, cataloged, indexed, encrypted, and/or organized in a variety of ways consistent with data storage practice. The memory modules in memory 412 may represent specialized modules for various functions described in the embodiments herein. By way of example, the memory module 412-1 may represent a specialized module configured to implement aspects of the choice and authentication step described above.

Similarly, the memory module 412-2 may form a specialized pull content module, the memory module 412-3 may form a specialized render page module, the memory module 412-4 may form a specialized authentication and navigation module, and the memory module 412-5 may form a specialized UI unit rendering module. The instructions embodied in these memory modules can cause the processor 404 to perform certain operations consistent with the functions described above.

In the embodiments herein, applications are developed and deployed with the following approach. Micro frontends are created, while avoiding containerization and running each micro frontend in each micro service. A service wrapper such as a Spring Boot Java wrapper is not used, since only UI static content is deployed in the target environment. Folder prefixes are used to delineate MFEs, and unique URLs are assigned to both MFEs and UI static content elements.

Artifacts and static content are extracted from docker image, built using a Jenkins workflow in one embodiment. Code is built and published in the docker image registry, and artifacts are pushed through a spinnaker pipeline to a specific target folder in an S3 bucket using an AWS elastic container task. Requested artifacts are fetched based on a requested URL using S3 software development kit (SDK).

Turning now to several general embodiments, descriptions are provided for an exemplary apparatus, an exemplary method, and an exemplary non-transitory computer-readable medium product. An exemplary non-transitory computer-readable medium includes instructions configured to cause a processor to perform operations including providing a consolidated enterprise application that provides, to a select set of users with credentialed private access to the consolidated enterprise application, web-based access in a form of a given user experience, the consolidated enterprise application comprising plural frontend web-based UI unit applications and an associated parent container application. The operations also include publishing content including the code to a web service storage, using API requests; pulling content including the code from the web service storage, using API requests; and a hosting server causing the UI unit applications and associated parent container application to be instantiated with a web browser.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

While the foregoing is directed to embodiments of the present disclosure, other and further embodiments of the disclosure may be devised without departing from the basic scope thereof, and the scope thereof is determined by the claims that follow.

What is claimed is:

1. An apparatus comprising:

storage encoded with computer executable code for a consolidated enterprise application configured to provide, to a select set of users with credentialed private access to the consolidated enterprise application, web-based access formed as a given user experience, the given user experience including providing access to user interface (UI) static content, the consolidated enterprise application comprising plural frontend web-based independent UI unit applications, the UI unit applications being individual non-containerized micro frontends, and an associated parent container application;

one or more content publishing interfaces configured to publish content including the code to a web service storage, wherein the one or more content publishing interfaces are each configured to use application program interface (API) requests to publish to content to the web service storage;

one or more content pulling interfaces configured to pull content including the code from the web service storage for execution of the consolidated enterprise application, wherein the one or more content pulling interfaces are each configured to use API requests to pull the content from the web service storage; and wherein, when the content is pulled for the execution of the consolidated enterprise application, the consolidated enterprise application comprises a plurality of the non-containerized micro frontends, the associated parent container application, and one or more UI static content objects, wherein each of the non-containerized micro frontends includes an application blueprint comprising a task definition that defines parameters for one or more containers, the task definition being used to instantiate an elastic container service (ECS) task within a cloud computing environment, wherein the instantiated ECS task executes the consolidated enterprise application; and a hosting server configured to cause the UI unit applications and the associated parent container application to be instantiated with a web browser.

2. The apparatus according to claim 1, further comprising a source code manager configured to create the code.

3. The apparatus according to claim 1, wherein the web service storage comprises object storage.

4. The apparatus according to claim 3, wherein the web service storage comprises a simple storage service (S3).

5. The apparatus according to claim 4, wherein the web service storage comprises one or more S3 buckets.

6. The apparatus according to claim 5, wherein the API requests used by the one or more content publishing interfaces and used by the one or more content pulling interfaces are REST (representational state transfer) API requests.

7. A method comprising:

providing a consolidated enterprise application that provides, to a select set of users with credentialed private access to the consolidated enterprise application, web-based access formed as a given user experience, the given user experience including providing access to user interface (UI) static content, the consolidated enterprise application comprising plural frontend web-based independent UI unit applications, the UI unit applications being individual non-containerized micro frontends, and an associated parent container application;

publishing content including the code to a web service storage, using API (application program interface) requests;

pulling content including the code from the web service storage for execution of the consolidated enterprise application, using API requests; and wherein, when the content is pulled for the execution of the consolidated enterprise application, the consolidated enterprise application comprises a plurality of the non-containerized micro frontends, the associated parent container application, and one or more UI static content objects, wherein each of the non-containerized micro frontends includes an application blueprint comprising a task definition that defines parameters for one or more containers, the task definition being used to instantiate an elastic container service (ECS) task within a cloud computing environment, wherein the instantiated ECS task executes the consolidated enterprise application; and a hosting server causing the UI unit applications and the associated parent container application to be instantiated with a web browser.

8. The method according to claim 7, further comprising a source code manager creating the code.

9. The method according to claim 7, wherein the web service storage comprises object storage.

10. The method according to claim 9, wherein the web service storage comprises an Amazon S3 (simple storage service).

11. The method according to claim 10, wherein the web service storage comprises one or more S3 buckets.

12. The method according to claim 11, wherein the API requests are representational state transfer (REST) API requests.

13. A non-transitory computer-readable medium including instructions configured to cause a processor to perform operations comprising:

providing a consolidated enterprise application that provides, to a select set of users with credentialed private access to the consolidated enterprise application, web-based access formed as a given user experience, the given user experience including providing access to user interface (UI) static content, the consolidated enterprise application comprising plural frontend web-based independent UI unit applications, the UI unit applications being individual non-containerized micro frontends, and an associated parent container application;

publishing content including the code to a web service storage, using application program interface (API) requests;

pulling content including the code from the web service storage for execution of the consolidated enterprise application, using API requests; and wherein, when the content is pulled for the execution of the consolidated enterprise application, the consolidated enterprise application comprises a plurality of the non-containerized micro frontends, the associated parent container application, and one or more UI static content objects, wherein each of the non-containerized micro frontends includes an application blueprint comprising a task definition that defines parameters for one or more containers, the task definition being used to instantiate an elastic container service (ECS) task within a cloud computing environment, wherein the instantiated ECS task executes the consolidated enterprise application; and a hosting server causing the UI unit applications and the associated parent container application to be instantiated with a web browser.

14. The non-transitory computer-readable medium according to claim 13, wherein the web service storage comprises a simple storage service (S3).

15. The non-transitory computer-readable medium according to claim 14, wherein the web service storage comprises one or more S3 buckets.

16. The non-transitory computer-readable medium according to claim 15, wherein the API requests are representational state transfer (REST) API requests.

* * * * *